US009560585B2

(12) United States Patent
Forssell

(10) Patent No.: US 9,560,585 B2
(45) Date of Patent: Jan. 31, 2017

(54) METHOD AND APPARATUS FOR ACCESS NETWORK SELECTION

(71) Applicant: Nokia Solutions and Networks Oy, Espoo (FI)

(72) Inventor: Mika Forssell, Porvoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/434,599

(22) PCT Filed: Oct. 12, 2012

(86) PCT No.: PCT/EP2012/070267
§ 371 (c)(1),
(2) Date: Apr. 9, 2015

(87) PCT Pub. No.: WO2014/056544
PCT Pub. Date: Apr. 17, 2014

(65) Prior Publication Data
US 2015/0282058 A1    Oct. 1, 2015

(51) Int. Cl.
*H04W 48/18* (2009.01)
*H04W 48/16* (2009.01)
(Continued)

(52) U.S. Cl.
CPC ............ *H04W 48/18* (2013.01); *H04W 48/16* (2013.01); *H04W 84/042* (2013.01); *H04W 84/12* (2013.01); *H04W 88/06* (2013.01)

(58) Field of Classification Search
CPC ...... H04W 88/06; H04W 48/17; H04W 88/02; H04W 48/14; H04W 48/16; H04W 48/18; H04W 84/042; H04W 84/045; H04W 84/12; H04W 88/16; H04W 28/0289; H04W 48/08; H04L 12/5692; H04L 47/122; H04L 47/24; H04L 47/824
(Continued)

(56) References Cited

U.S. PATENT DOCUMENTS

| 2013/0208696 A1* | 8/2013 | Garcia Martin ...... H04W 36/32 370/331 |
| 2013/0272287 A1* | 10/2013 | Xiang .................. H04W 48/16 370/338 |

(Continued)

FOREIGN PATENT DOCUMENTS

| SE | WO 2009127238 | * 10/2009 | ............ H04W 48/18 |
| WO | WO 2009/127238 A1 | 10/2009 | |
| WO | WO 2009/149600 A1 | 12/2009 | |

OTHER PUBLICATIONS

3GPP TS 23.401 V11.2.0 (Jun. 2012), "3$^{rd}$ Generation Partnership Project; Technical Specification Group Services and System Aspects; General Packet Radio Service (GPRS) enhancements for Evolved Universal Terrestrial Radio Access Network (E-UTRAN) access ( Release 11)", 267 pgs.
(Continued)

*Primary Examiner* — Inder Mehra
(74) *Attorney, Agent, or Firm* — Harrington & Smith

(57) ABSTRACT

A method includes using a set of information for a plurality of different access networks, said plurality of networks including at least one cellular network and at least one local wireless network and a current priority associated with a user equipment to provide access network selection information to said user equipment for one or more of said a plurality of said network and causing said access network selection information to be provided to said user equipment. The set of information may include a set of priority information and/or a set of network access information.

20 Claims, 7 Drawing Sheets

(51) Int. Cl.
*H04W 88/06* (2009.01)
*H04W 84/12* (2009.01)
*H04W 28/02* (2009.01)
*H04W 4/00* (2009.01)
*H04L 12/911* (2013.01)
*H04L 12/851* (2013.01)
*H04W 84/04* (2009.01)

(58) Field of Classification Search
USPC ..... 370/328, 338, 400, 229, 332; 455/414.1, 455/418, 435.2, 435.3
See application file for complete search history.

(56) References Cited

U.S. PATENT DOCUMENTS

| | | | | |
|---|---|---|---|---|
| 2014/0092734 | A1* | 4/2014 | Ljung | H04W 48/06 370/230 |
| 2014/0355435 | A1* | 12/2014 | Umezuki | H04L 47/125 370/231 |

OTHER PUBLICATIONS

3GPP TS 23.401 V8.16.0 (Mar. 2012), "3$^{rd}$ Generation Partnership Project; Technical Specification Group Services and System Aspects; General Packet Radio Service (GPRS) enhancements for Evolved Universal Terrestrial Radio Access Network (E-UTRAN) access ( Release 11)", 238 pgs.

3GPP TS 23.402 V8.10.0 (Mar. 2012), "3$^{rd}$ Generation Partnership Project; Technical Specification Group Services and System Aspects; Architecture enhancements for non-3GPP accesses (Release 8)", 199 pgs.

3GPP TS 23.402 V11.3.0 (Jun. 2012), "3$^{rd}$ Generation Partnership Project; Technical Specification Group Services and System Aspects; Architecture enhancements for non-3GPP accesses (Release 11)", 252 pgs.

3GPP TS 24.312 V11.4.0 (Sep. 2012), "3$^{rd}$ Generation Partnership Project; Technical Specification Group Core Network and Terminals; Access Network Discovery and Selection Function (ANDSF) Management Object (MO) (Release 11)", 168 pgs.

3GPP TS 36.300 V11.3.0 (Sep. 2012), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 205 pgs.

3GPP TS 36.331 V11.1.0 (Sep. 2012), "3$^{rd}$ Generation Partnership Project; Technical Specification Group Radio Access Network; Evolved Universal Terrestrial Radio Access (E-UTRA); Radio Resource Control (RRC); Protocol specification (Release 11)", 325 pgs.

* cited by examiner

Figure 5

| RFSP Index | Priority | | | | | | | |
|---|---|---|---|---|---|---|---|---|
| | 7 | 6 | 5 | 4 | 3 | 2 | 1 | 0 |
| 1 | LTE2.6 | UMTS2.1 | UMTS900 | 2G1800 | 2G900 | | | |
| 2 | ANDSF | HS2.0 ANQP | LTE2.6 | UMTS2.1 | UMTS1900 | 2G1800 | 2G900 | |
| 3 | UMTS2.1 | UMTS900 | LTE800 | LTE2.6 | 2G1800 | 2G900 | | |
| 4 | HS2.0 ANQP | LTE2.6 | UMTS2.1 | UMTS1900 | 2G1800 | 2G900 | | |
| ... | ... | | | | | | | |
| 256 | | | | | | | | |

Figure 6

| Priority | Description |
|---|---|
| 1 (highest priority) | Use Wi-Fi network with SSID=OperatorHOME if available for all data services, the network provides carrier grade quality access to services. Netflix service shall use only this Wi-Fi network. |
| 2 | Use roaming partner Wi-Fi network with SSID=PartnerXYZ during 7-9 am and 3-5 pm near train station to avoid/prevent congestion in mobile network and avoid paying unnecessary fee for roaming partner (every time user uses roaming partner network it costs money for home operator) |
| 3 (lowest priority) | Use 3GPP network if above rules don't apply (e.g. Wi-Fi not available) |

Figure 7

| RFSP Index | Priority | | | | | | | |
|---|---|---|---|---|---|---|---|---|
| | 7 | 6 | 5 | 4 | 3 | 2 | 1 | 0 |
| 1 | LTE2.6 | UMTS2.1 | UMTS900 | 2G1800 | 2G900 | | | |
| 2 | ANDSF/2 | LTE2.6 | UMTS2.1 | UMTS1900 | 2G1800 | 2G900 | | |
| 3 | ANDSF | HS2.0 ANQP | LTE2.6 | UMTS2.1 | UMTS1900 | 2G1800 | 2G900 | |
| 4 | UMTS2.1 | UMTS900 | LTE800 | LTE2.6 | 2G1800 | 2G900 | | |
| 5 | HS2.0 ANQP | LTE2.6 | UMTS2.1 | UMTS1900 | 2G1800 | 2G900 | | |
| ... | ... | | | | | | | |
| 256 | | | | | | | | |

METHOD AND APPARATUS FOR ACCESS NETWORK SELECTION

This disclosure relates to a method and apparatus and in particular but not exclusively to method and apparatus for use for example for network selection.

A communication system can be seen as a facility that enables communication sessions between two or more entities such as fixed or mobile communication devices, base stations, servers, machine type communication devices and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication such as access to the communication system and feedback messaging shall be implemented between communicating devices. The various development stages of the standard specifications are referred to as releases.

A communication can be carried on wired or wireless carriers. In a wireless communication system at least a part of communications between stations occurs over a wireless link. Examples of wireless systems include public land mobile networks (PLMN) such as cellular networks, satellite based communication systems and different wireless local networks, for example wireless local area networks (WLAN). A wireless system can be divided into cells or other radio coverage or service areas provided by a station. Radio service areas can overlap, and thus a communication device in an area can send and receive signals within more than one station. Each radio service area is controlled by an appropriate controller apparatus. Higher level control may be provided by another control apparatus controlling a plurality of radio service area.

A wireless communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment.

Wi-Fi networks are becoming an integrated part of mobile broadband. Wi-Fi is a standard feature for example on devices which consume a relatively large amount of data such as smart phones, tablets and laptops.

According to an aspect there is provided a method comprising: using a set of information for a plurality of different access networks, said plurality of networks comprising at least one cellular network and at least one local wireless network and a current priority associated with a user equipment to provide access network selection information to said user equipment for one or more of said a plurality of said networks; and causing said access network selection information to be provided to said user equipment.

The set of information comprises at least one of a set of priority information and a set of network access policy information.

The causing said access network selection information to be provided to said user equipment may comprise causing said access network information to be sent to said user equipment in a message in accordance with a message protocol associated with at least one cellular network.

The priority information may comprise a plurality of categories of different priority and at least one category comprises a plurality of networks of different priority.

The priority information may comprise radio frequency selection priority information.

The priority information may comprise a default.

The default may comprise one or more cellular networks.

When the current priority indicates that a local wireless local area network is to be used, said causing may comprise causing said user equipment to use a network additionally in dependence on a further set of priority information associated with said local wireless network.

When said current priority indicates that a local wireless local area network is to be used, said causing may comprise causing said user equipment to use a network additionally in dependence on a subset of a further set of priority information associated with said local wireless network.

The further set of priority information may comprise access network discovery and selection information or access network query protocol information.

According to another aspect, there is provided a method comprising: receiving network access selection information for a user equipment for a plurality of networks comprising at least one cellular network and at least one local wireless network, said network access selection information provided in dependence on a current priority associated with a user equipment; and using said network access selection information to select one of said plurality of networks.

The receiving information may comprise receiving information in a message in accordance with a message protocol associated with at least one cellular network.

The selecting may comprise selecting a type of network and if a local wireless local area network type is selected, said method may comprise causing said user equipment to use a set of priority information associated with said local wireless network type to select a network.

The selecting may comprise selecting a type of network and if a local wireless local area network type is selected, said method comprises causing said user equipment to use a subset of a set of priority information associated with said local wireless network type to select a network.

The set of priority information may comprise access network discovery and selection information or access network query protocol information.

According to another aspect, there is provided an apparatus comprising at least one processor and at least one memory including computer code for one or more programs, the at least one memory and the computer code configured, with the at least one processor, to cause the apparatus at least to: use a set of information for a plurality of different access networks, said plurality of networks comprising at least one cellular network and at least one local wireless network, and a current priority associated with a user equipment to provide access network selection information to said user equipment for one or more of said a plurality of said networks; and causing said access network selection information to be provided to said user equipment. The set of information may be a set of priority information and/or a set of network selection policy information.

The at least one memory and the computer code may be configured with the at least one processor to cause the apparatus to cause said access network information to be sent to said user equipment in a message in accordance with a message protocol associated with at least one cellular network.

The priority information may comprise a plurality of categories of different priority and at least one category comprises a plurality of networks of different priority.

The priority information may comprise radio frequency selection priority information.

The priority information may comprise a default.

The priority information may contain a validity period and optionally rules as to what to do after a validity period. For example this may be to use an earlier used priority, set a new priority or the like The default may comprise one or more cellular networks.

The at least one memory and the computer code may be configured with the at least one processor to cause the apparatus to, when said current priority indicates that a local wireless local area network is to be used, cause said user equipment to use a network additionally in dependence on a further set of priority information associated with said local wireless network.

The at least one memory and the computer code may be configured with the at least one processor to cause the apparatus to, when said current priority indicates that a local wireless local area network is to be used, to cause said user equipment to use a network additionally in dependence on a subset of a further set of priority information associated with said local wireless network.

The further set of priority information may comprise access network discovery and selection information or access network query protocol information.

According to another aspect, there is provided an apparatus comprising at least one processor and at least one memory including computer code for one or more programs, the at least one memory and the computer code configured, with the at least one processor, to cause the apparatus at least to: receive network access selection information for a user equipment for a plurality of networks comprising at least one cellular network and at least one local wireless network, said network access selection information provided in dependence on a current priority associated with a user equipment; and use said network access selection information to select one of said plurality of networks.

The at least one memory and the computer code may be configured with the at least one processor to cause the apparatus to receive information in a message in accordance with a message protocol associated with at least one cellular network.

The at least one memory and the computer code may be configured with the at least one processor to cause the apparatus to select a type of network and if a local wireless local area network type is selected, to cause said user equipment to use a set of priority information associated with said local wireless network type to select a network.

The at least one memory and the computer code may be configured with the at least one processor to cause the apparatus to select a type of network and if a local wireless local area network type is selected, to cause said user equipment to use a subset of a set of priority information associated with said local wireless network type to select a network.

The set of priority information may comprise access network discovery and selection information or access network query protocol information.

A user equipment may comprise the above apparatus.

A computer program comprising program code means adapted to perform the methods may also be provided.

Various other aspects and further embodiments are also described in the following detailed description and in the attached claims.

Embodiments will now be described in further detail, by way of example only, with reference to the following examples and accompanying drawings, in which.

Figure 4:
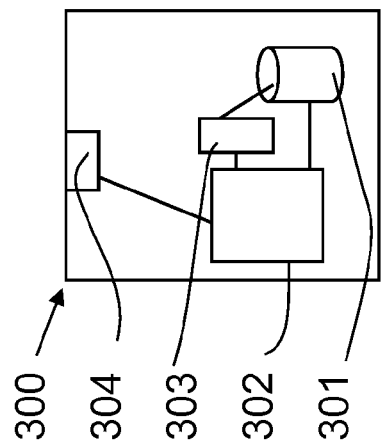
Figure 3:
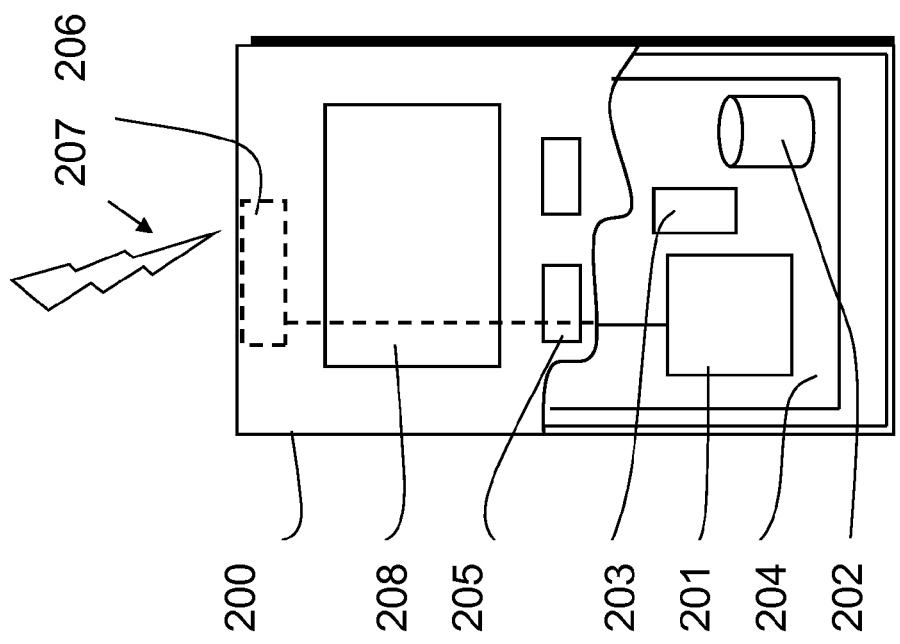

FIG. 3 schematically shows a user equipment;

FIG. 4 schematically shows control apparatus;

FIG. 5 shows a first table;

FIG. 6 shows a second table;

FIG. 7 shows a third table; and

Figure 8:
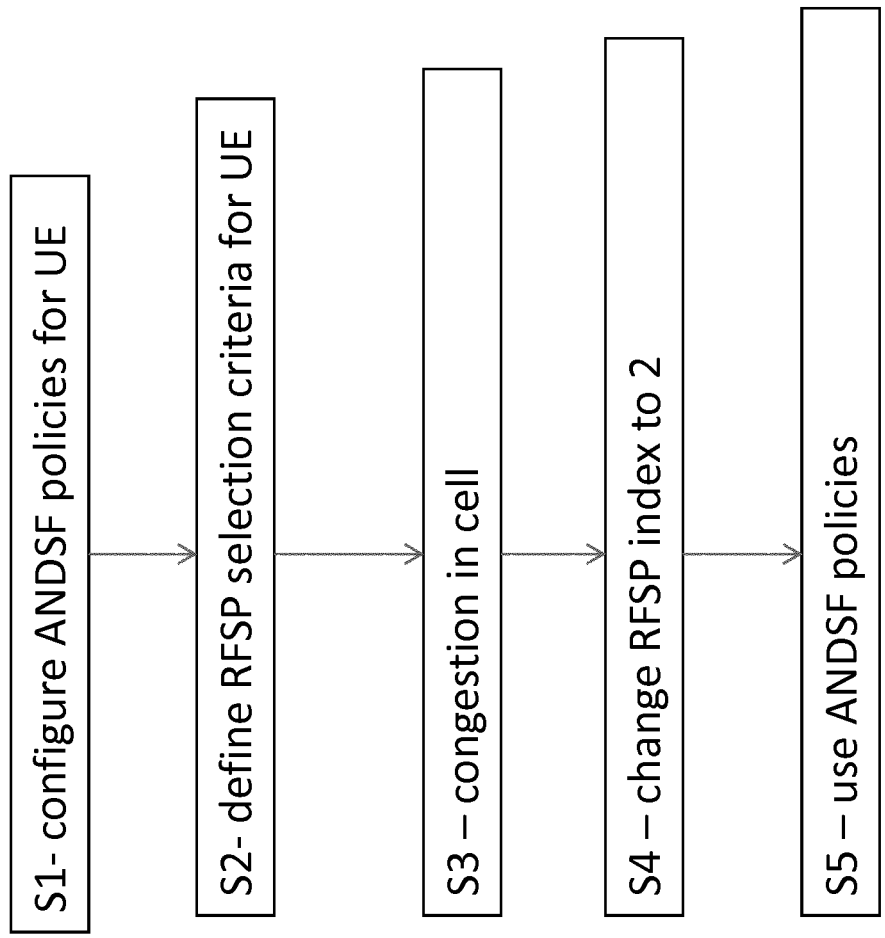

FIG. 8 shows a first method.

In the following certain exemplifying embodiments are explained with reference to a cellular mobile communication system serving mobile communication devices and a wireless area network and the interaction there between.

Before explaining in detail the exemplifying embodiments, certain general principles of a cellular wireless communication system are briefly explained with reference to FIG. 1 to assist in understanding the technology underlying the described examples.

In a cellular communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units.

Figure 1:
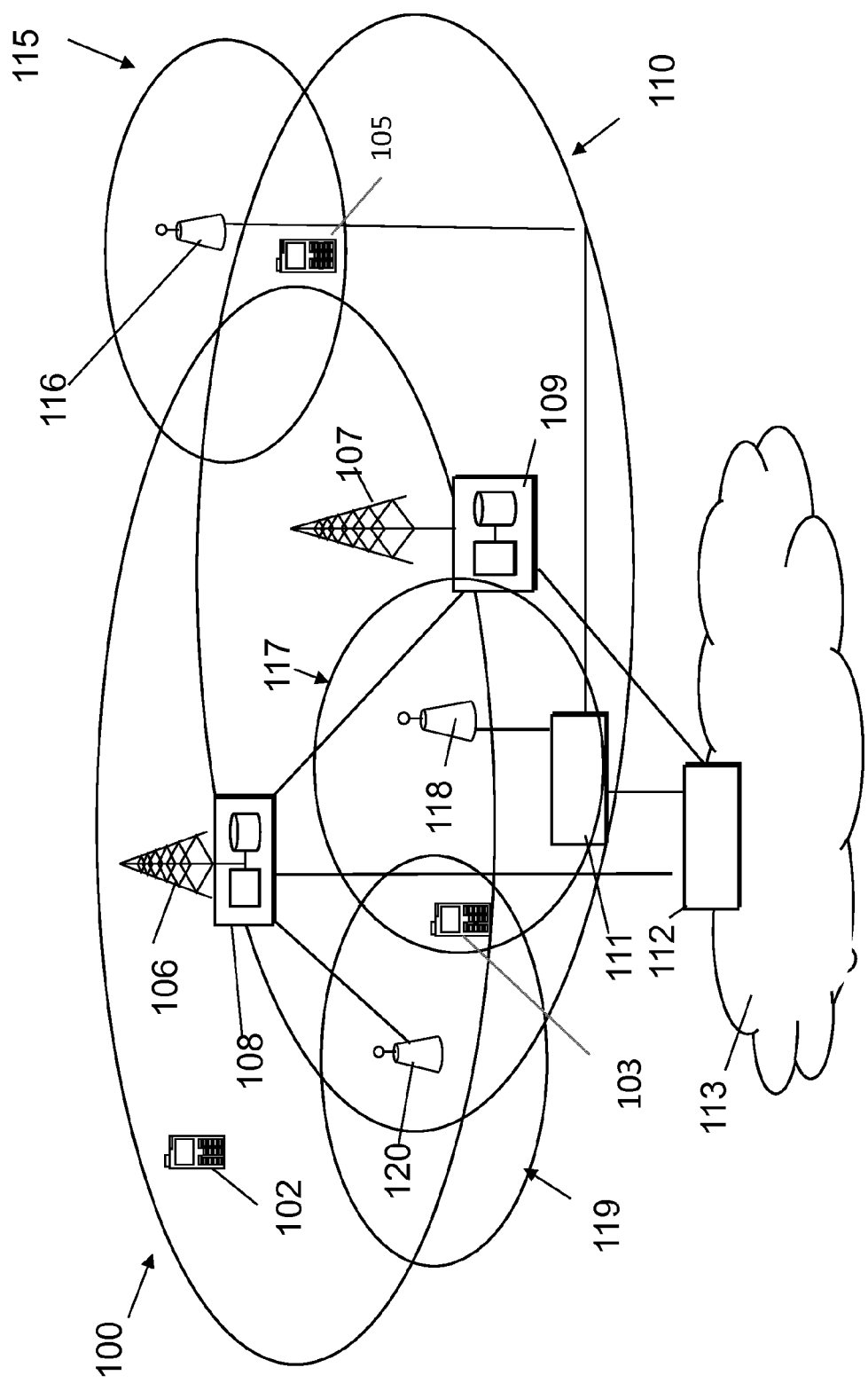
FIG. 1 shows a schematic diagram of a cellular communication system.

In FIG. 1 stations 106 and 107 are shown as connected to a wider communications network 113 via gateway 112. A further gateway function may be provided to connect to another network. The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108.

Wi-Fi networks are in some places becoming an integral part of mobile broadband. Wi-Fi is a standard feature on some smart phones, tablets and laptops. Some operators are using or planning to use Wi-Fi alongside mobile radio access networks. As Wi-Fi becomes just another cell alongside mobile radio access networks, some operators need to control how the user device or user equipment moves between the mobile and Wi-Fi networks. In some embodiments, dynamic mechanisms may be required in order to control the movement of the user equipment between the mobile and Wi-Fi networks.

For example, a network operator may wish to offload selected users to a Wi-Fi network only when certain conditions are satisfied. For example, if there is congestion in the mobile network, the network operator may wish to offload some of the users to a Wi-Fi network. In some cases the operator may wish to control when the users are using the mobile network. This control may be provided for one or more reasons. For example, the control may be required for policy reasons, user experience reasons, network management reasons, network performance reasons, charging reasons and/or traffic management reasons.

Currently, the network selection tool which guide how the user moves between mobile and Wi-Fi networks may be static. For example, the access network discovery and selection function ANDSF is an entity which is provided in some 3GPP networks. See for example 3GPP TS 23.402. The ANDSF server assists a user equipment to discover non-mobile networks such as Wi-Fi or the like which can be used for data communication instead of or in addition to the mobile network.

Figure 2:
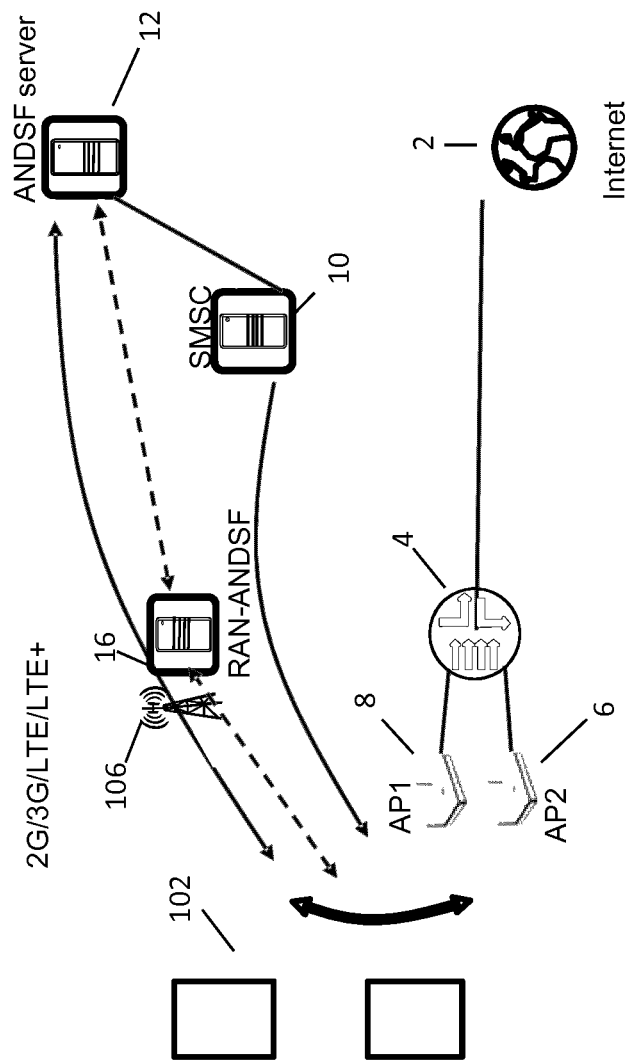
FIG. 2 shows a schematic diagram of a local wireless network.

Reference is made to FIG. 2 which shows an example of a high level network architecture with an ANDSF server and illustrates its operation. The system shown in FIG. 2 comprises user equipment 102. The user equipment is arranged to be able to connect to a first access point or a second access point 6 or 8. The access points 6 and 8 are connected to a router 4 which permits connection to for example the Internet 2. Alternatively or additionally connections may be made to an operator packet core network and GGSN (gateway GPRS (general packet radio service) support node and/or P-GW (packet gateway according to operator requirements. The access points 6 and 8 along with the router 4 can be considered to provide the Wi-Fi function.

The user equipment 102 is also arranged to be able to connect to an access node 106 of a mobile network. The access node 106 may be a base station, node B, eNodeB or the like. Optionally provided is a RAN-ANDSF (radio access network-ANDSF). The RAN-ANDSF may be arranged to communicate with an ANDSF server 12. Alternatively the RAN-ANDSF may be a functional extension to RAN (Radio Access Network) where the RAN-ANDSF is located. The RAN-ANDSF may for example be located in the eNodeB (integrated or separate to the RRM (Radio Resource Management)) and may consider also Wi-Fi as part of traffic management, with or without having direct interface to ANDSF server 12. A SMSC (short message service centre) 10 is provided, as an example enabling the ANDSF server 12 to initiate communication with the UE and send settings to the UE.

Currently, the 3GPP standard describes the ANDSF functionality provided by an ANDSF server. Currently, the ANDSF server contains all of the ANDSF functionality. However, in some embodiments, a hierarchical ANDSF approach is used to provide more online control over user device network/selection. This may provide an efficient traffic steering method across the mobile and Wi-Fi networks without introducing unnecessary network functional complexity. Thus, optionally a local ANDSF server or functionality may be provided. This is referenced RAN-ANDSF 16 in the embodiment shown in FIG. 2. This local ANDSF server functionality may operate independently or complement the ANDSF server which provides overall network selection rules for the device.

The ANDSF server as specified in current 3GPP standard is used to provide overall network selection policies to a user device that do not change frequently. Currently, an ANDSF server is not expected to communicate with the UE frequently. These policies may include for example the roaming partner Wi-Fi networks the user device should utilize when available, overall network selection policies for operator hotspots, and default network discovery and selection rules for the UE. In some embodiments the overall ANDSF server may be a separate ANDSF server or integrated with the RAN-ANDSF server. In a network of one operator there may be one or more ANDSF and/or RAN-ANDSF servers, for example one RAN-ANDSF server per cell/location/tracking area/routing area/NodeB/eNodeB and/or RNC.

In some embodiments, the RAN-ANDSF functionality may be provided in a server. The RAN-ANDSF function may be located on the RAN (Radio Access Network) level. The RAN-ANDSF may allow the radio access network to participate in decision making as to when the user device uses mobile and Wi-Fi networks and/or as to when traffic is offloaded to a Wi-Fi network and/or as to when traffic is on loaded to a mobile network. In some embodiments, the RAN-ANDSF functionality may be located in an AP integrating a mobile base station (such as an eNB) and a Wi-Fi AP. This combined access point of the cell is aware of resource utilization of both the mobile cell and Wi-Fi AP. In such a case the RAN-ANDSF may also participate into decision making when traffic is offloaded from Wi-Fi to a mobile network when e.g. Wi-Fi utilization is too high. Alternatively or addition in non-combined AP case, where Wi-Fi AP and (e)NodeB are separate, network performance may be monitored and some UEs may be on loaded to a mobile network for example when Wi-Fi is congested and mobile network has available capacity.

In other embodiments, alternatively or additionally ANDSF related functionality may be placed elsewhere in the network, such as the packet core, P-GW/DPI (Packet gateway/Deep Packet Inspection and/or PCRF (Policy and Charging Rules Function, like PCRF-ANDSF).

The ANDSF may provide an operator with a tool to for example:

Offload selected users to a Wi-Fi network when the cell becomes congested;

Offload selected users to a Wi-Fi network when the user uses a particular application;

Offload selected users to a Wi-Fi network when user experience (such as QoS) is not achieved in mobile network or mobile network performance is not sufficient;

On load selected users to mobile network when Wi-Fi AP (hotspot) becomes congested;

On load selected users to mobile network when the user uses a particular application;

On load selected users to mobile network when Wi-Fi network is not able to maintain required service level (like bitrate, QoS);

Offload selected user(s) to Wi-Fi network when PCRF (policy charging and rules function) or the like detects user defined QoS cannot be achieved in mobile network;

On load selected user(s) to mobile network when PCRF (or the like) detects user defined QoS cannot be achieved in Wi-Fi network. This may for example be via packet core integration, the PCRF learns through GGSN/P-GW even if the user uses Wi-Fi;

For example video streaming or peer to peer (BitTorrent etc.) may be offloaded to a Wi-Fi network with local breakout, with traffic bypassing mobile radio and core networks;

When the radio/core network becomes short on resources, for example to serve VIP subscribers with an adequate quality of experience, offload selected other user(s) to Wi-Fi;

Offload selected users to Wi-Fi when the user profile indicates to do so. For example, this may be included in a PCRF or the like (for example when a data cap for a month is used up in the mobile network (e.g. 1 GB/month), Wi-Fi usage is encouraged more, or if a user has used a monthly quota or any defined volume in the Wi-Fi network, the PCRF may trigger a change of ANDSF policies for a particular user to discourage Wi-Fi use to avoid a situation where a UE tries to connect primarily to a hotspot and access is denied as a result of exceeding monthly quota); and/or Optimized use of available network performance and resources, for example the radio networks.

A possible mobile communication device will now be described in more detail in reference to FIG. 3 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 102 may receive signals over an air interface 207 via appropriate apparatus for receiving and may transmit signals via appropriate apparatus for transmitting radio signals. In FIG. 3 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIG. 1, 2 or 3, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with Tx antenna numbers or port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices can access the communication system based on various access techniques, such as long term evolution (LTE), code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node-Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Examples of local area access system include systems based on technologies such as wireless local area network (WLAN) and/or WiMax (Worldwide Interoperability for Microwave Access).

The ANDSF may provide the user equipment with rules relating to the connection of the user equipment with the Wi-Fi network. However, ANDSF does not support online communication between the user device and an ANDSF server to dynamically set network selection policies for a user device based on a changing network environment, for example.

Currently, the ANDSF standard allows the definition of static Wi-Fi selection rules into user devices. However, the current ANDSF standard does not support on line, need based communication. The ANDSF standards allows for the definition of one or more criteria for network selection such as prioritized network identifiers (for example SSIDs), time-of-day, location and/or application.

Currently, there are a number of different radio access technologies and/or frequencies which may be available to a given user. For example, a user may have a 2G network, a 3G network or an LTE the network available. Different ones of these networks may have different frequencies. For example, LTE may have an 800 MHz frequency and/or a 2600 MHz frequency.

In 3GPP TS 23.401, a RFSP (RAT (radio access technology) frequency selection priority) is defined. This allows a mobile operator to give the user equipment specific instructions as to how the various different access networks are to be used. The current RFSP mechanism may define only RAT selection for 3GPP networks.

Reference is made to FIG. 5 which shows a first table 1 used in some embodiments. In some embodiments, the existing 3GPP RFSP mechanism is modified to include Wi-Fi information. Wi-Fi is by way of example. Other types of network such as a non-3GPP network, WiMax and CDMA may alternatively or additionally be used as an example). This Wi-Fi information may for example take the form of ANDSF information and/or hot spot ANQP (access network query protocol) information and/or similar network discovery and selection information defined by ANDSF or ANQP but formatted and executed solely by the 3GPP radio access network or packet core, for example Bearer/Session Management, specific mechanisms. The user equipment can thus be instructed using the RFSP mechanism to take into account Wi-Fi network information such as ANDSF network discovery information, selection information and/or policies, and/or or hot spot ANQP information and/or policies. Both ANDSF and ANQP define priorities and/or network selection criteria for different networks. For example ANQP may indicate to a UE that, for example, operator.com is available via this hotspot, and thus an operator subscriber UE knows to connect to that. Wi-Fi AP load information may be used. An ANDSF may also define where, when and/or how the user equipment should use utilise Wi-Fi networks.

When an ANDSF or a hotspot ANQP priority is evaluated by the user equipment within a RFSP mechanism, the user equipment may start utilising for example the ANDSF policies received separately from the ANDSF server, or ANDSF like policies, for example a prioritised SSID (service set identifier) list) optionally accompanied by time of day/location/application specific network selection criteria obtained from RRC (radio resource control) messaging, SIB (system information broadcast) or the like 3GPP messages. In the RFSP mechanism table shown in FIG. 5, the table is set out to keep the user in the mobile network by default. In other words, the RFSP index 1 will indicate the mobile networks usable by the user. Index 1 is the default index in this example. Those networks with the priority 7 have a higher priority than those networks indicated with priority 6 and so on. This may for example prevent users from using Wi-Fi hotspots unnecessarily.

However, when for example the cell which the user is using becomes congested or is no longer able to fulfil quality of service requirements and/or service levels or the like, the RFSP index 2 may be enabled for one or more selected user devices. This may enable a more aggressive use of Wi-Fi networks for example in accordance with ANDSF policies leaving more resources available in the mobile network. This may prevent congestion on the mobile cell and/or improve user experience. In the example shown in FIG. 5, the ANDSF network selection rules (e.g. prioritized Wi-Fi hotspot list) is shown with a higher priority than the ANQP network selection rules or LTE network.

ANQP is a query and response protocol used by mobile device to discover a range of information such as the hot spot operator's domain name, roaming partners accessible via the hotspot along with for example their credential type and the method supported for authentication, AP load information, IP address type availability and/or other meta data used by the mobile device for network selection. This is part of the IEEE 802.11 standard. As an example, in case the UE, guided by the RFSP mechanism, reaches priority with ANQP ID, the UE may consider optional ANQP policies configured into the UE (separately) and ANQP information provided by available Wi-Fi APs when selecting Wi-Fi network to be used. ANQP policy provisioning is optional in some embodiments. The UE may try to match also received ANQP info against "pre-configured information" set to the UE before UE is sold to the user or configured by the user into the UE.

The RAN-ANDSF server may be part of Wi-Fi AP where the RAN-ANDSF may provide Wi-Fi network load/performance/user experience information to a network element deciding how a UE or UEs under a defined area should select access networks (LTE, 3G, 2G, Wi-Fi). For example a RAN-ANDSF in a Wi-Fi AP may provide Wi-Fi network performance information to a RAN-ANDSF in (e)NB allowing the (e)NB RAN-AND SF to consider if the nearby Wi-Fi network should be encouraged to be used within the RFSP mechanism or not. Or the RAN-ANDSF in Wi-Fi AP may provide a Wi-Fi congestion indicator to a RAN-ANDSF in the (e)NB that may cause deprioritizing of a Wi-Fi network within the RFSP mechanism setting RAT selection priorities for the UEs.

Reference will now be made to FIG. 8 which shows a method.

In step S1, the AND SF server configures one or more ANDSF policies for the user equipment. This may be done at any suitable time. For example, this may be done where there is a new subscriber to a service, where a new user device connects to the mobile network for the first time, or where the subscriber has bought mobile data subscription enabling an additional Wi-Fi service, or an operator has a new roaming partner. It should be appreciated that alternatively or additionally, these policies may change for a particular user equipment over time and updates to this policy may be provided to the user equipment.

Reference is made to table 2, shown in FIG. 6. This shows an example of ANDSF service network discovery and selection policies for a user equipment. It should be appreciated that the policies shown in table 2 are by way of example only. These policies may provide an indication of priority. In the example shown in table 2, priority 1 is the highest priority and priority 3 is the lowest priority. It should be appreciated that there may be more or less than three priorities. In this example, the user equipment uses a Wi-Fi network if the operator's home network is available. This may be indicated by the SSID of the Wi-Fi network indicating that the network belongs to the operator and is a home network of that operator. The network may provide carrier grade quality access to services. By way of example, some types of service may only use this Wi-Fi network. By way of example, 'Netflix' services can only be used with this type of network. In this example, Netflix is a service which provides films to a user equipment. It should be appreciated that alternative or additional services may also be constrained to only use the home Wi-Fi network. These services may for example be the services which provide a relatively large quantity of data to a user. In other words a user cannot access these services via a partner Wi-Fi network or mobile cellular network.

In the example shown in table 2, the next highest priority, 2, is to use a roaming partner Wi-Fi network during predetermined times, for example 7 to 9 AM and 5 to 7 PM near a train station. The partner network will again be identified by the appropriate SSID. By limiting the use of the partner Wi-Fi network to particular times, the operator is able to avoid or prevent congestion in the mobile network during peak times and at the same time avoid paying unnecessary roaming fees other than at the specified times. It should be appreciated that in some embodiments, use of the partner Wi-Fi network may be limited to other times and/or days to those indicated. In some embodiments, the limitation may be defined in response to for example events. In other embodiments, there may be no time and/or location limitation.

One example of a message is given below having 0 (as it is optional) to maxn3GPP (e.g. 10) non 3GPP Container information elements where each non 3GPP Container defines a network identifier, network selection priority (see for example FIG. 5) and optional additional network selection criteria (for example time of day, location, application, acceptable network load, provided services, and/or supported operators) The information elements may provide information similar to or the same as the policy criteria of ANDSF or ANQP.

```
SystemInformationBlockTypeX ::=    SEQUENCE {
    ...,
    non3GPPInfo          non3GPPInfoIE                                OPTIONAL,   -- Need OR
    ...,
}
non3GPPInfoIE ::=       SEQUENCE (SIZE (1..maxn3GPP)) OF non3GPPContainer
non3GPPContainer ::=    SEQUENCE {
    ssid                 STRING (size (maxSSID)),
    selectionPriority    INTEGER (0..7)
    selectionCriteria    selectionCriteriaList                        OPTIONAL
    },
    ...
}
```

In the third or lowest priority option, the user equipment is controlled to use the 3GPP network if the priority options 1 or 2 are not available. In this example, this means the UE goes back to evaluating the next highest RAT priority within RFSP mechanism.

By utilising only the above-mentioned ANDSF policies, the user equipment would connect to the operator's home Wi-Fi whenever that service is available. This may be for example when the user starts to use a browser to watch web content. If the home operator is not available when starting to use the browser, the user equipment will then look for the Wi-Fi operated by the partner network with the specified partner identity. This will be used if other criteria are valid. For example, if the time and location does not match the defined criteria, then the partner Wi-Fi network would not be used. If for example, the Netflix service is used, then again that would not be possible with the partner Wi-Fi network. If the user equipment is unable to select the partner Wi-Fi network (or indeed its own home network), then the user equipment will use the mobile network. The Wi-Fi network may not be selectable because either the Wi-Fi network is not available or the criterion specified is not matched. For example, it may be outside the hours of 7 to 9 AM and 5 to 7 PM or the user may not be near the train station.

In an alternative embodiment, alternatively or in some cases additionally, mobile communication network messages exchanged between the user device and network may define the Wi-Fi network selection policies. These selection policies may for example be similar to that described previously. This may mean that the user equipment may not be required to support the ANDSF or ANQP technology. The messages exchanged between the user device and network are in accordance with the mobile cellular network message protocol. For example, the messages may be SIB messages or RRC messages or Bearer/Session/Mobility Management messages. For example, the packet core, such as DPI/PCRF/P-GW, requires a change in used access method and the MME/S-GW communicates this to the UE (directly or via HSS/MME/RAN).

This contains information within an SIB message broadcasted to user equipment in a cell. In one embodiment, the message may be a system information block type X message where X is for example 15 or 19 or the like. The message may alternatively be an RRC message, a Session/Mobility Management related message involving MME/S-GW, Packet Measurement Order, Packet Cell Change Order or any other message exchanged between UE and the mobile network.

The message will contain in any suitable format information indicating which Wi-Fi network or networks may be used by a user equipment, such as priority information and/or criteria for using the or each Wi-Fi network. While Wi-Fi is used as a specific example, the embodiments may alternatively or additionally apply also to other non-3GPP networks like CDMA or WiMax (these latter networks are also supported by ANDSF).

When a user equipment receives for example a system information block type 5 message and a system information block type X message (containing Wi-Fi selection priority information), the user device would be able to identify how to select the LTE and Wi-Fi networks. The type 5 message is an E-UTRA specific message defining the RFSP selection priority for LTE RAT and frequency as mentioned previously. The user device would also be able to determine the RAT priorities for the LTE and Wi-Fi networks and whether or not the there is any other limitation with respect to time-of-day, location, application etc. This may be in respect of the Wi-Fi network or the mobile network. Where the additional selection criteria apply to the Wi-Fi network, this may be included in the selection criteria list included in the system information block type X. Other system information blocks, such as system information block type 8 may define other 3GPP RATs and their selection priority information within the RFSP mechanism.

A RRC message, such as an RRC connection release message may have similar RFSP mechanism RAT priority information to that defined in above in the example of the non-3GPP network container. Currently, 3GPP defines the RFSP content (only RAT priorities) within the RRC connection release message. In one embodiment, one or more RRC messages transferred between the base station and the user device when the user devices in active mode may include information relating to the Wi-Fi network. This information may indicate when the user device should start looking for a Wi-Fi network even during an on-going session for example when there is cell congestion or when a quality of service requirement cannot be met or the like. By way of example, the message may be an RRC bearer management message or Session/Mobility Management message involving RAN or SGSN/MME.

In step S2, an operator may wish to keep users primarily in a mobile network and utilise Wi-Fi networks as a backup network in order to avoid congestion, ensure service quality/user experience and/or provide additional wireless capacity when needed. Accordingly, the network operator may define the RFSP selection criteria for the user, as shown in table 1.

The RFSP mechanism works in a way that a HSS manages a user specific RFSP index, i.e. network specific setting for a user guiding UE RAT selection. When for example the UE attaches to a mobile network, the HSS provides the RFSP index to SGSN/MME. The SGSN/MME considers the HSS provided RFSP index and may use that index as such or apply some of its own policies and mechanisms to define the RFSP index provided to RAN, for example an (e)NB. The Operator has configured a RAT priority table such as shown in FIG. 5, into the RAN where each RFSP index is mapped to defined RAT priorities. The RAN (for example (e)NB) communicates applied RAT selection priorities (such as for example a row from the table of FIG. 5) to the UE using 3GPP standardized mechanisms, such as SIB messages, a RRC Connection Release message, or in some embodiments a RRC radio bearer management message, Packet Measurement Order/Packet Cell Change Order message, Session/Mobility Management message or the like. Based on the defined RAT priorities within RFSP mechanism, the UE is able to select the highest priority RAT according to network requirements to improve user experience, manage/avoid cell/network congestion, maintain adequate service level, apply user specific policy control rules and/or the like. It should be appreciated that FIG. 5 is by way of example only and different tables may of course be used in different embodiments.

As RFSP index 1 may be set to be active by default, the user equipment is instructed initially to utilise only mobile cellular networks. As can be seen, all of the networks available with index 1 are mobile cellular networks.

In step S3, the cell which the user is using via the mobile network becomes congested. This may be determined by any suitable node, for example the base station or a higher node such as RNC (Radio Network Controller). In some embodiments, this congestion may be noted by a radio resource manager RRM. Accordingly, the operator may wish to offload selected users who have a Wi-Fi subscription to a nearby Wi-Fi network to leave more resources for other mobile users. The user equipment which are offloaded to the Wi-Fi network may be done using any suitable criteria, such as user priority, QoS class, UE capability knowledge, services used, amount of traffic transferred, radio quality (e.g. number of retransmissions, signal quality, and/or UE on cell edge) and/or the like. As an option, if priorities of RATs and Wi-Fi networks broadcasted in SIB messages are changed then all UEs under the cell may be affected instead of selecting affected UEs. This may be done by for example changing the LTE RAT selection priority in SIB5 and Wi-Fi RAT selection priority in another SIB message.

In some embodiments, this may be achieved in step S4 by the operator/RAN (such as NB/eNB/RNC)/HSS and/or SGSN/MME assigning RFSP index 2 for selected user/user equipment. In some embodiments, following the current 3GPP standards RFSP mechanism may require communicating RAT priorities to UE and updating these in case of changes, as the RFSP index itself may not be transmitted to the UE. In some embodiments, the user equipment may have access to the RFSP table described e.g. in FIG. 5, e.g. RFSP table is downloaded to the UE using RRC/Session/Mobility Management message or SIB message, and thus the network simply needs to communicate RFSP index (like RFSP index=2) to the user equipment in RRC/Session/Mobility Management message in order to cause the user equipment to changing UE RAT priorities including 3GPP and Wi-Fi RATs. Thus some embodiments change the RFSP index instead of communicating new priorities for each RAT.

In alternative embodiments, the RFSP index 2 as such is not communicated to the user equipment but instead information is provided to the user equipment such that the user equipment will start using the Wi-Fi. For example RAT priorities for the RATs are provided in the RFSP mechanism in SIB/RRC/other suitable message. This may be achieved by using RAT priority information. Mechanisms which may be used are as for example defined in 3GPP TS 36.300 and TS 36.331. The decision to assign a new RFSP index for a user equipment may be done within the radio access network, for example the base station or by a core network element. For example, a user equipment may be offloaded to a Wi-Fi network as a result of the user equipment using a specific type of application which the user equipment should preferentially or only use with the Wi-Fi network. This may be for example peer-to-peer communication, a particular application such as Netflix or the like. This may be detected as a result of DPI (deep packet inspection). A user equipment may for example be offloaded if a packet gateway has too high a load. In this example, offload to Wi-Fi without packet core integration is targeted. The user equipment may be offloaded if the PCRF determines that the user has exceeded his monthly network quota, the GGSN/P-GW is not able to maintain QoS/service level (PCRF is connected to GGSN/P-GW), the operator changes user service rights. If the PCRF participates in RFSP mechanism, the PCRF may communicate with the HSS, SGSN/MME and/or RAN to provide input to user specific RFSP mechanism. Preferably the PCRF communicates with HSS or SGSN/MME from where the RFSP mechanism changes are evaluated and combined with other criteria, before communicating a new RFSP index to RAN to enable to holistic user RFSP management. The same applies for P-GW/DPI or the like packet core elements, which may also provide a RFSP mechanism input to the HSS, MME and/or RAN. The ANDSF server may have a role as a network element managing user specific HetNet traffic steering policies and thus combine information providing an input to the RFSP mechanism communicated to HSS, SGSN/MME and/or RAN.

In step S5, the user equipment starts considering the ANDSF network discovery and selection policies in order to choose which network to be used. For example, when the user starts to use the browser, the user equipment will then use the RAT selection policies and/or priorities derived from table 2 and communicated to the UE. Accordingly, the first priority network will be the home Wi-Fi network of the operator and the user equipment will try to find the SSID of the operator's home network.

The RFSP index is changed for a user equipment when changing from priority 1 to priority 2 and then executing required RAT policy/priority changes towards UE. In some embodiments, to ensure that the user equipment receives RFSP instructions immediately as required, RFSP priority change information may be provided in radio related messaging such as RRC messaging. For example, a field may be provided for this purpose. The RRC messages may be managing messages such as messages to manage the bearers to provide the information to the user equipment promptly. Thus, when the user equipment is engaged in active communication consuming network resources, the network is able to instruct the user equipment immediately to select mobile and Wi-Fi networks for example to balance traffic across mobile and Wi-Fi networks and reduce network congestion.

In some embodiments, alternatively or additionally, system information messages may define an optional cell RFSP index that instructs the user equipment camped on that cell to use a cell specific RFSP index RAT priority list when in the cell area, assuming the RAT priority list is provided to the UE in SIB, RRC or other message allowing to make the reference. Instead of sending the RFSP index, SIB messages may be changed to indicate different selection priorities for each RAT type, including Wi-Fi. For example to cause an effect where RFSP Index is changed from 1 to 2, this can be achieved by changing SIB5 contents to lower LTE priority and changing SIBx (for example 15 or 19 or the like) message to increase the Wi-Fi and ANDSF/ANQP priority. By default SIB messages are broadcast messages destined to all UEs under the cell. In order to use SIB messages as part of RFSP mechanism only for targeted users, some group ID (such as a bitmap) may be included into SIB message(s) indication to which UEs the network selection priorities apply. The UEs may be assigned the "group ID" for example when the UE associates with a new cell as part of RRC messaging or SGSN/MME Session/Mobility Management messaging.

As an option, a trigger to change network discovery and selection policies may be received in a Paging message. Currently a Paging message is used to alert the UE for example about an incoming call/SMS/MME. The Paging message may be enhanced to contain RFSP mechanism information, in addition to user identity such as an IMSI, to have the UE for example to start using "RFSP index 2" instead of "RFSP index 1" or to communicate a list of changed RAT selection priorities to the UE as part of RFSP mechanism.

In some embodiments optionally or additionally, the network may define for the user equipment a schedule or time period when a given RFSP index is valid. For example, the RFSP index may be changed from one value to a second value and there may be an associated validity after which the user equipment reverts to the previous or a defined RFSP index. For example, when the RFSP index changes to a new value, the validity period may define the length of time for which the user equipment uses the new RFSP index. At the end of that period, the user of equipment will revert to the previously used RFSP index.

Alternatively or additionally, a schedule may be defined for the RFSP index. For example, one index may be the default index and another index is used at a predetermined time. For example, the another index may be used at particular times a day such as 7 to 9 AM, otherwise the default index is used.

As ANDSF and ANQP define already network selection rules, prioritisation of these mechanisms may be provided. For example, the user equipment may prioritise the RFSP mechanism over AND SF and ANQP to avoid conflicts between the different mechanisms. For example when the network indicates support for an enhanced RFSP mechanism containing also Wi-Fi priorities, the UE follows the RFSP mechanism when using RAT selection policies and ANDSF/ANQP policies only when indicated by the RFSP mechanism. The indication if the network supports Wi-Fi in RFSP may become via a UE and/or network supporting a specific 3GPP release, a new field in SIB/RRC messages, and/or a UE detecting in a SIB/RRC/other message Wi-Fi information (such as ANDSF/ANQP/SSIDs) as part of the RFSP mechanism. In this case the UE does not follow ANDSF or ANQP policies and rules unless instructed by the RFSP mechanism.

In some embodiments, referring purely to ANDSF and/or ANQP profiles or policies may not address operator requirements. For example, if an operator wanted to enable utilisation of the roaming partner Wi-Fi hotspots only when the operators own mobile network performance goes below a threshold, referencing simply to ANDSF policies may not be satisfactory as the ANDSF policy will direct the user equipment to the roaming partner Wi-Fi if the operator's own hotspot is not available. Accordingly, in some embodiments, the RFSP mechanism may be modified to include a more detailed reference to one or more parts of the ANDSF/ANQP/3GPP Wi-Fi policies and container. This may be included in a system information block message, RRC message and/or other suitable message, such as previously described.

Reference is now made to table 3 shown in FIG. 7. This table has been modified as compared to table 1 in that when the index is RFSP index 2, instead of referring purely to ANDSF policies, an ANDSF<2 reference is made to the ANDSF policy. This means that only an ANDSF network priority less than two is acceptable (i.e. only priority 1). This means that where a user equipment is camped in the cell, the user equipment can use the operator own Wi-Fi hotspots when available to balance traffic between the mobile network and the Wi-Fi network belonging to the same operator but the roaming partner Wi-Fi network may not be used. This is because in this example, the priority less than two means that the priority one option is only available. In this regard, reference is made to table 2 which shows that with priority one, only the home operator Wi-Fi network can be used.

When the cell becomes more congested or quality of service cannot be met, RFSP index 3 is assigned to the selected user equipment. According to table 3, this means that the full ANDSF policies can now be used. This means that if the home operated Wi-Fi network is not available, a Wi-Fi network operated by a roaming partner is now usable by the user equipment, if available. This means that offload of mobile traffic to Wi-Fi networks, including also defined roaming partners, can be done in order to restore acceptable cells utilisation levels.

In this example shown, this is in the context of the ANDSF policies shown in table 2. It should be appreciated that of course there may be different categorisations of priority and different numbers of priorities available in different embodiments. It should be appreciated that the example of the criteria of less than two may be different in different embodiments, for example less than three or defined as being equal to a particular priority. Where the ANDSF policies are more detailed, it should be appreciated that one or more different parts of the policy can be associated with different ones of the RFSP index/mechanism.

In some embodiments, the Wi-Fi selection options may be integrated as part of the table. For example each entry in the table of FIG. 2 would be associated with a particular entry in the RFSP table. In this way the need for a separate ANDSF or the like table maybe avoided.

In some embodiments, the more fine-grained Wi-Fi selection criteria may be provided to the user equipment in for example the selection criteria list included in the messaging discussed previously.

Alternatively or additionally, instead of using ANDSF policies as already defined when referred to by the RFSP mechanism, some embodiments may allow the user to use a ANDSF management object MO branch defined for RFSP use. The ANDSF/RFSP priority identity in the RFSP table/mechanism may indicate that the user equipment should use this management object.

For example, when the user equipment detects in the RFSP mechanism that the ANDSF/RFSP priority is activated, the user equipment will look for a particular leaf or branch in the management object structure (RFSP leaf in this example). The leaf or branch may be relevant only for RFSP and there may be one or more RFSP specific leafs/branches that can be referenced by the RFSP mechanism (such as ANDSF/RFSP-1, ANDSF-RFSP-2 etc.) allowing finer granularity control of RAT selection (such as low congestion and heavy congestion). This branch will provide network discovery and selection rules following for example otherwise already discussed ANDSF features. For example, the RFSP branch will define one or more of the already defined ANDSF components such as prioritised SSID list, time-of-day, location, application and/or criteria that the user equipment will not use by default but only when the RFSP mechanism refers to that. The RFSP branch may also include a validity period limiting the usage of that branch or the time may be provided to the user equipment in a message such as an SIB or RRC message. The same may also apply for ANQP and ANQP policies.

The MO may be an XML structure in some embodiments. An example of such a management object is provided below.

```
ANDSF MO parameters
General  20
Node: <X>
<X>/Name
Policy
<X>/Policy
<X>/Policy/<X>
<X>/Policy/<X>/RulePriority
<X>/Policy/<X>/PrioritizedAccess
<X>/Policy/<X>/PrioritizedAccess/<X>
<X>/Policy/<X>/PrioritizedAccess/<X>/ AccessTechnology
<X>/Policy/<X>/PrioritizedAccess/<X>/ AccessId
<X>/Policy/<X>/PrioritizedAccess/<X>/ SecondaryAccessId
<X>/Policy/<X>/PrioritizedAccess/<X>/ AccessNetworkPriority
<X>/Policy/<X>/ValidityArea
<X>/Policy/<X>/ValidityArea/3GPP_Location
<X>/Policy/<X>/ValidityArea/3GPP_Location/<X>
<X>/Policy/<X>/ValidityArea/3GPP_Location/<X>/PLMN
<X>/Policy/<X>/ValidityArea/3GPP_Location/<X>/TAC
<X>/Policy/<X>/ValidityArea/3GPP_Location/<X>/LAC
<X>/Policy/<X>/ValidityArea/3GPP_Location/<X>/GERAN_CI
<X>/Policy/<X>/ValidityArea/3GPP_Location/<X>/UTRAN_CI
<X>/Policy/<X>/ValidityArea/3GPP_Location/<X>/EUTRA_CI
...
<X>/Policy/<X>/TimeOfDay
<X>/Policy/<X>/TimeOfDay/<X>
<X>/Policy/<X>/TimeOfDay/<X>/TimeStart
<X>/Policy/<X>/TimeOfDay/<X>/TimeStop
<X>/Policy/<X>/TimeOfDay/<X>/DateStart
<X>/Policy/<X>/TimeOfDay/<X>/DateStop
<X>/Policy/<X>/UpdatePolicy
...
<X>/Policy/<X>/RFSP
<X>/Policy/<X>/RFSP /RulePriority
<X>/Policy/<X>/RFSP /PrioritizedAccess
```

-continued

```
<X>/Policy/<X>/RFSP /PrioritizedAccess/<X>
<X>/Policy/<X>/RFSP /PrioritizedAccess/<X>/ AccessTechnology
<X>/Policy/<X>/RFSP /PrioritizedAccess/<X>/ AccessId
<X>/Policy/<X>/RFSP /PrioritizedAccess/<X>/ SecondaryAccessId
<X>/Policy/<X>/RFSP /PrioritizedAccess/<X>/ AccessNetworkPriority
<X>/Policy/<X>/RFSP /ValidityArea
...
<X>/Policy/<X>/RFSP /TimeOfDay/<X>
...
<X>/ISRP/<X>/RFSP/ForFlowBased
...
```

In some embodiments, this structure may use already defined ANDSF features and provides an operator RFSP container activated and used only when the RFSP mechanism indicates that it should be.

It should be appreciated that this management object is one example of a method which allows information relating to Wi-Fi network selection to be provided.

In case the RFSP mechanism specific leaf/branch is used, the operator should ensure configuration of RFSP index mapping to RFSP RAT policies/priorities within the HSS/SGSN/MME and/or RAN is able to reference to correct branches. For example during power up each affected element is configured with the same configuration details.

The RFSP mechanism is used by the HSS, SGSN/MME, RAN and/or user equipment. The RFSP index may be stored into the HSS which provides the index to SGSN/MME which further provides the index to the RAN (Radio Access Network) as such or after combining other SGSN/MME policies/information to the RFSP index provided to the RAN, for example as part of RRC Connection Release messaging guiding the UE.

The ANDSF server may in some embodiments receive triggers from various parts of the network, such as RAN, Wi-Fi performance monitor, PCRF, DPI, P-GW, SGSN, MME or the like, and may thus initiate the changing of the RFSP index and selection mechanism for a given device e.g. via HSS, MME or RAN communication. Other entities may additionally or alternatively initiate the changing of the RFSP index.

The HSS may allow the operator to define specific Wi-Fi policies in order to achieve a desired Wi-Fi selection outcome such as indicated above. For example, when a Wi-Fi service is added into a subscriber mobile data subscription, the RFSP mechanism and index reflects that, taking into account the Wi-Fi options as well.

The RAN (base station) may create the RFSP priority table to guide the user equipment mobility and RAT/network selection both in the idle and active modes. The operator may configure the RAT priority table mapping to different RFSP indexes to RAN (for example (e) NB) for example. during (e)NB power up and configuration. In one embodiment, the RAN is able to create RAT selection policies automatically by itself as a result of combining network performance information of different RATs (optionally including Wi-Fi networks as well), user experience and service level information, backhaul performance/load information etc.

The PCRF may monitor and manages the user experience, quality of service, data (monthly data volume limit or associated monetary value) and/or other subscriber specific values. When the PCRF detects, for example an exceeded monthly quota, that the network performance may not be able to meet the performance criteria such as quality of service or the like, the PCRF may communicate with another entity to cause a change in the RFSP. The PCRF may communicate for example with the HSS to cause changes to the RFSP value assigned for the SGSN/MME/RAN and further to the user equipment (e.g. for the rest of the month). Additionally or alternatively, the PCRF may have an interface to SGSN/MME or a direct interface to the RAN, for example the base station, to cause changes to the RFSP mechanism for a specific user equipment. The PCRF may communicate also with the ANDSF server allowing the ANDSF server to consider PCRF requirements against other user network selection requirements and then provide the resulting RFSP index/information to the HSS, SGSN/MME and/or RAN.

The ANDSF server manages HetNet discovery and selection priorities (3GPP and non-3GPP such as Wi-Fi, WiMax and CDMA). The ANDSF server and/or other network elements may monitor network performance, application usage, quality of service or the like—in both mobile and Wi-Fi networks (in mobile RAN/Traffica and in Wi-Fi Element Management System as an example). These may be used to trigger changes in the RFSP mechanism, via ANDSF server or via direct communication towards RAN, to find for example an optimal balance between user experience and HetNet resource utilisation. For example if Wi-Fi performance monitoring element (e.g. Element Management System) detects congestion in Wi-Fi, the element may request the RAN to change the RFSP mechanism so that it starts favouring more mobile network usage for UEs under the area.

In this example, two types of network have been described as being Wi-Fi networks and mobile cellular networks. It should be appreciated that Wi-Fi is one example of a wireless network and any other suitable local wireless network may alternatively or additionally be used. For example, Wi-Max may be used. The examples of mobile cellular network are by way of example only. It should be appreciated that alternative embodiments may use alternate or additionally different types of mobile cellular networks.

Various entities have been described as being used in embodiments. These entities are by way of example only and alternative or additional entities may be used alternatively or additionally.

One or more entities of may be provided with a control apparatus. FIG. 4 shows an example of a control apparatus. The control apparatus 400 can be configured to provide control functions. For this purpose the control apparatus 400 comprises at least one memory 301, at least one data processing unit 302, 303 and an input/output interface 304. Via the interface the control apparatus can be coupled to receive information and/or commands and/or provide as an output information and/or commands. The control apparatus 400 can be configured to execute an appropriate software code to provide the control functions.

The required data processing apparatus and functions of an apparatus in a network element and/or a mobile device and/or core network element may be provided by means of one or more data processor. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may be practiced in various components such as integrated circuit modules. The design of integrated circuits is by and large an automated process. Complex and powerful tools are available for converting a logic level design into a semiconductor circuit design ready to be formed on a semiconductor substrate.

It is noted that whilst embodiments have been described in relation to particular standards similar principles can be applied to any other communication system. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

The invention claimed is:

1. A method comprising:
using a set of information for a plurality of different access networks, said plurality of networks comprising at least one cellular network and at least one local wireless network to provide access network selection information to a user equipment for said plurality of said networks, wherein the network access selection information is provided in dependence on congestion of one of the at least one cellular network and the at least one wireless network, wherein network access selection information is to be used by the user equipment to select one of the plurality of networks, using a current set of access networks and corresponding priorities for the access networks, and the priorities are based on reducing or avoiding congestion in whichever one of the at least one cellular network or the at least one wireless network is congested; and
causing said access network selection information to be provided to said user equipment, wherein said access network selection information allows said user equipment to select one of said plurality of networks and to access said selected network.

2. A method as claimed in claim 1, wherein said set of information comprises at least one of a set of priority information and a set of network access policy information.

3. A method as claimed in claim 1, wherein said causing comprises causing said user equipment to use a network additionally in dependence on a further set of priority information associated with said local wireless network, or on a subset of a further set of priority information associated with said local wireless network.

4. The method of claim 1, wherein:
the method further comprises sending multiple sets of access networks and corresponding priorities to the user equipment, wherein each of the multiple sets of access networks has corresponding priorities;
each of the multiple sets of access network is indexed using a different index value;
the network access selection information comprises an indication of an index; and
the user equipment is to select the current set of access networks and their corresponding priorities from multiple sets of access networks using the index and its value.

5. The method of claim 1, wherein the network access selection information comprises indications of the current set of access networks and their corresponding priorities, and wherein the user equipment is to select the selected network using the current set of access networks and their corresponding priorities instead of a previous set of access networks and their corresponding priorities.

6. A method comprising:
receiving network access selection information for a user equipment for a plurality of networks comprising at least one cellular network and at least one local wireless network, said network access selection information provided in dependence on congestion of one of the at least one cellular network and the at least one wireless network;
selecting one of said plurality of networks using the network access selection information, wherein selecting is performed using a current set of access networks and corresponding priorities for the access networks, and the priorities are based on reducing or avoiding congestion in whichever one of the at least one cellular network or the at least one wireless network is congested; and
accessing said selected network.

7. A method as claimed in claim 6, wherein said selecting comprises selecting a type of network and if a local wireless local area network type is selected, said method comprises causing said user equipment to use a set of priority information associated with said local wireless network type to select a network.

8. A method as claimed in claim 7, wherein said set of priority information comprises access network discovery and selection information or access network query protocol information.

9. A method as claimed in claim 6, wherein said selecting comprises selecting a type of network and if a local wireless local area network type is selected, said method comprises causing said user equipment to use a subset of a set of priority information associated with said local wireless network type to select a network.

10. The method of claim 6, wherein the network access selection information comprises an indication of an index, and wherein selecting further comprises selecting the current set of access networks and their corresponding priorities from multiple sets of access networks using the index, wherein each of the multiple sets of access networks has corresponding priorities.

11. The method of claim 6, wherein the network access selection information comprises indications of the current set of access networks and their corresponding priorities, and wherein selecting further comprises using the current set of access networks and their corresponding priorities instead of a previous set of access networks and their corresponding priorities.

12. A computer program comprising computer executable instructions which when run cause the method of claim 1 to be performed.

13. An apparatus comprising at least one processor and at least one memory including computer code for one or more programs, the at least one memory and the computer code configured, with the at least one processor, to cause the apparatus at least to:
use a set of information for a plurality of different access networks, said plurality of networks comprising at least one cellular network and at least one local wireless network to provide access network selection information to a user equipment for said a plurality of said networks wherein the network access selection information is provided in dependence on congestion of one of the at least one cellular network and the at least one wireless network, wherein network access selection information is to be used by the user equipment to select one of the plurality of networks, using a current set of access networks and corresponding priorities for the access networks, and the priorities are based on reducing or avoiding congestion in whichever one of the at least one cellular network or the at least one wireless network is congested; and
causing said access network selection information to be provided to said user equipment, wherein said access network selection information allows said user equipment to select one of said plurality of networks and to access said selected network.

14. Apparatus as claimed in claim 13, wherein said set of information comprises one or more of a set of priority information and a set of network access policy information.

15. Apparatus as claimed in claim 13, wherein the at least one memory and the computer code are configured with the at least one processor to cause the apparatus to cause said user equipment to use a network additionally in dependence on a further set of priority information associated with said local wireless network or, on a subset of a further set of priority information associated with said local wireless network.

16. An apparatus comprising at least one processor and at least one memory including computer code for one or more programs, the at least one memory and the computer code configured, with the at least one processor, to cause the apparatus at least to:
receive network access selection information for a user equipment for a plurality of networks comprising at least one cellular network and at least one local wireless network, said network access selection information provided in dependence on congestion of one of the at least one cellular network and the at least one wireless network;
select one of said plurality of networks using the network access selection information, wherein selecting is performed using a current set of access networks and corresponding priorities for the access networks, and the priorities are based on reducing or avoiding congestion in whichever one of the at least one cellular network or the at least one wireless network is congested; and accessing said selected network.

17. Apparatus as claimed in claim 16, wherein the at least one memory and the computer code are configured with the at least one processor to cause the apparatus to receive information in a message in accordance with a message protocol associated with at least one cellular network.

18. Apparatus as claimed in claim 16, wherein the at least one memory and the computer code are configured with the at least one processor to cause the apparatus to select a type of network and if a local wireless local area network type is selected, to cause said user equipment to use a set of priority information associated with said local wireless network type to select a network.

19. Apparatus as claimed in claim 18, wherein said set of priority information comprises access network discovery and selection information or access network query protocol information.

20. Apparatus as claimed in claim 16, wherein the at least one memory and the computer code are configured with the at least one processor to cause the apparatus to select a type of network and if a local wireless local area network type is selected, to cause said user equipment to use a subset of a set of priority information associated with said local wireless network type to select a network.

* * * * *